United States Patent
Allouche et al.

(10) Patent No.: US 8,350,570 B2
(45) Date of Patent: Jan. 8, 2013

(54) PIPE SURVEY METHOD USING UWB SIGNAL

(75) Inventors: Erez Allouche, Ruston, LA (US); Arun Prakash Jaganathan, Ruston, LA (US); Neven Simicevic, Ruston, LA (US)

(73) Assignee: Louisiana Tech Research Foundation; a division of Lousiana Tech University Foundation, Inc., Ruston, LA (US)

( * ) Notice: Subject to any disclaimer, the term of this patent is extended or adjusted under 35 U.S.C. 154(b) by 386 days.

(21) Appl. No.: 12/675,480

(22) PCT Filed: Aug. 29, 2008

(86) PCT No.: PCT/US2008/074832
§ 371 (c)(1), (2), (4) Date: Feb. 26, 2010

(87) PCT Pub. No.: WO2009/029819
PCT Pub. Date: Mar. 5, 2009

(65) Prior Publication Data
US 2010/0237871 A1   Sep. 23, 2010

Related U.S. Application Data
(60) Provisional application No. 60/969,286, filed on Aug. 31, 2007.

(51) Int. Cl.
*G01V 3/08* (2006.01)
(52) U.S. Cl. ............................... 324/337; 324/334

(58) Field of Classification Search .............. 324/334, 324/337
See application file for complete search history.

(56) References Cited

U.S. PATENT DOCUMENTS

| | | | |
|---|---|---|---|
| 6,573,721 | B1 | 6/2003 | Cull |
| 6,664,914 | B2 | 12/2003 | Longstaff et al. |
| 6,956,534 | B2 | 10/2005 | Hagiwara |
| 7,508,336 | B2 | 3/2009 | Leskin |
| 7,539,271 | B2 | 5/2009 | Shor et al. |
| 7,570,063 | B2 | 8/2009 | Van Veen et al. |
| 2007/0002930 | A1 | 1/2007 | Tekin |

OTHER PUBLICATIONS

Picosecond Pulse Labs; Real Time Sampling Downconverter Front Ends for Digital Radar and Wide-Band Signaling; Nov. 2004; Boulder, Colorado.
International Searching Authority, Search Report and Written Opinion issued in PCT/US2008/074832, Nov. 19, 2008.
International Searching Authority, Internation Preliminary Report on Patentability issued in PCT/US2008/074832, Jan. 22, 2010.

*Primary Examiner* — Bot Ledynh
(74) *Attorney, Agent, or Firm* — Jones Walker Waechter Poitevent Carrere & Denegre LLP

(57) ABSTRACT

A method of surveying the condition of an underground enclosure including the steps of (a) positioning at least one transmitter/receiver unit (including an antenna) within an underground, substantially nonconductive enclosure, such that a substantial air gap exists between the antenna and the inner wall of the enclosure; (b) transmitting an ultra wideband (UWB) signal toward at least a portion of the inner wall; and (c) processing the return signal in order to identify the interface between the soil and a region of conductivity different from the soil.

21 Claims, 16 Drawing Sheets

PIPE SURVEY METHOD USING UWB SIGNAL

"This application is a national stage application under 35 USC §371 of PCT/US2008/074832, filed on Aug. 29, 2008, which claims the benefit under 35 USC §119(e) to U.S. provisional application No. 60/969,286, filed Aug. 31, 2007, all which are incorporated by reference herein in their entirety."

TECHNICAL FIELD

The present invention relates broadly to a subsurface inspection of enclosed spaces and the surrounding soil. In particular embodiments, the invention relates to a subsurface pipeline inspection system capable of detecting voids and foreign objects existing in the soil surrounding the conduits.

BACKGROUND ART

Many subsurface enclosed spaces require periodic inspection to evaluate the condition of the enclosure walls and the soil conditions surrounding the enclosure. Obvious examples are water and sewer pipe systems, but other examples of subsurface enclosures may include military bunkers, underground storage structures, subway tunnels, tunnels in large infrastructure (e.g., dams) or vertical enclosures such as missile silos or water cisterns. Underground enclosures deteriorate over time under the action of various applied and environmental loads, chemical and microbiological induced corrosions and differential settlements. Many underground pipes across the US average 60 years of age and have exceeded their designed life expectancy. The failure of the pipe system may allow surrounding soil and other materials to be eroded and washed into the pipe (infiltration) causing a large void in the soil surrounding the pipe. If this condition becomes sufficiently acute, it can lead to catastrophic surface subsidence, commonly known as "sinkholes." If the void and subsidence occur beneath a roadway or building, the damage to infrastructure is severe and can have life-threatening consequences.

Sufficiently large subsurface pipelines such as sewer lines and storm water drains are often inspected using manual access. This involves a person entering the pipeline system and carrying out a manual inspection of the pipe walls. However, this method reveals only surface defects in the pipe walls and gives no information on defects in the surrounding soils. This method also has inherent dangers and health risks for the person carrying out the inspection.

More recently, remote controlled Closed Circuit Television (CCTV) has also been employed in inspecting subsurface pipelines. This method involves the use of a small camera which is mounted on a sledge at the end of a flexible cable or on a self-propelled transporter. The camera is placed into the pipeline through an access opening and is then remotely controlled from the surface. This method removes the dangers involved in a person entering the pipeline, however, this method again reveals only surface defects in the pipe walls and gives no information on defects in the surrounding soils.

In order to inspect the bedding of a subsurface pipeline as well as detect defects that cannot be easily identified using CCTV equipment, more elaborate techniques have been employed such as ground probing radar (GPR) and sonar, profilometers, and seismic methods. Sonar systems are typically used to detect deposits at the invert of the pipe below the water level. Profilometer systems are typically used to measure the ovality of the pipe. The GPR systems normally consist of a transmitting antenna emitting electromagnetic radiation, a receiving antenna and an energy detecting device, or receiver. A portion of the transmitted signal is intercepted by a reflecting object, such as the wall of the pipeline, and is reradiated in all directions. The energy reradiated in the back direction is collected by the receiving antenna and delivered to a receiver, where it is processed to detect the presence of the pipeline. The time taken for the radar signal to traverse through the pipe and back is measured. Defects in the soil surrounding the pipeline are detected by using time measurement and known soil characteristics, and comparing this information to site drawings.

Seismic methods measure the velocity and refraction of seismic waves in a manner similar to the electromagnetic radiation measurements of GPR. However, seismic methods are based on long wavelengths with a resulting reduction in resolution. Further, both the GPR and seismic methods require complex equipment and processing which results in low productivity and high costs.

DISCLOSURE OF INVENTION

One embodiment of the invention is a method of surveying the condition of an underground enclosure. The method includes the steps of: (a) positioning at least one transmitter/receiver unit (including an antenna) within an underground, substantially nonconductive enclosure, such that a substantial air gap exists between the antenna and the inner wall of the enclosure; (b) transmitting an ultra wideband (UWB) signal toward at least a portion of the inner wall; and (c) processing the return signal in order to identify the interface between the soil and a region of conductivity different from the soil.

Another embodiment of the invention is a similar method including the steps of: (a) positioning at least one transmitter/receiver unit (including an antenna) within an underground, substantially nonconductive conduit, where the antenna has a substantially in-line configuration; (b) transmitting a UWB signal toward a portion of the inner wall of the conduit; and (c) processing the return signal in order to identify the conduit inner wall, the soil/conduit interface or the void/conduit interface.

A further embodiment is a method having the steps of: (a) positioning a carriage assembly within an underground, substantially nonconductive conduit, where the carriage assembly includes at least one transmitter/receiver unit, including an antenna and the antenna is capable of rotating with respect to the carriage assembly; (b) transmitting a UWB signal toward at least a portion of an inner wall of the conduit; and (c) processing the return signal in order to identify the conduit inner wall, the soil/conduit interface or the void/conduit interface.

A further embodiment is a method having the steps of: (a) positioning a carriage assembly within an underground, substantially nonconductive conduit, where the carriage assembly includes at least one transmitter/receiver unit, including an antenna wherein the antenna position with respect to the carriage assembly can be adjusted via a mechanically operated lifting device; (b) transmitting a UWB signal toward at least a portion of an inner wall of the conduit; and (c) processing the return signal in order to identify the conduits inner wall, soil/conduit interface or the void/conduit interface.

A still further embodiment is a transmitter/receiver unit including (a) a signal generator capable of producing an UWB signal which has (i) a frequency between about 1 GHz and about 15 GHz; and (ii) a pulse length of between about 500 nsec and about 100 psec; and (b) an antenna capable of changing the direction of signal transmission.

Another transmitter/receiver unit embodiment includes circuitry producing a first UWB signal with a pulse length between about 500 nsec and about 100 psec and a second UWB signal with a pulse length less than 100 psec; and an antenna transmitting the signals over an arc of at least 120°.

BEST MODE FOR CARRYING OUT THE INVENTION

Figure 1:
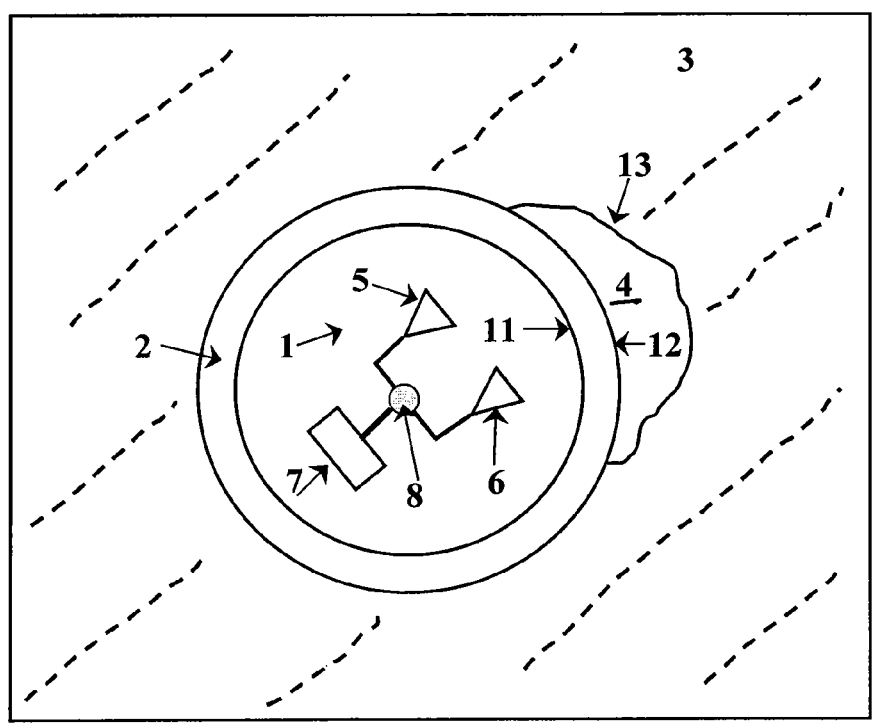
FIG. 1 is a schematic illustration of one embodiment of the present invention.

FIG. 1 illustrates one embodiment of a method contemplated by the present invention. FIG. 1 shows schematically a cross section of a conduit or pipe 2 positioned in the ground and surrounded by soil 3. A void 4 is shown as having formed against one portion of pipe 2. Positioned in pipe 2 is transmitter/receiver unit 1 which is capable of transmitting electromagnetic energy and receiving the return reflection from various material interfaces such as the inner pipe wall interface 11 (between the internal pipe space and the inner pipe wall), the outer pipe wall interface 12 (between the outer pipe wall and the void 4), and the void/soil interface 13 (between the void 4 and the soil 3). The signal from transmitter/receiver unit 1 generates a reflection at these interfaces due to the change in electrical properties (e.g., permittivity) of the medium through which the electromagnetic wave travels. Thus, as suggested above, a reflection is generated at the various interfaces, including the interface 13 of the less conductive (air) void and the more conductive soil. This characteristic will create reflections at other significant conductive discontinuities through which the signal travels. For, example, an interface between soil and an underground boulder or between the soil and another pipe (an "external pipe," either conductive or nonconductive) would create a reflection.

In the embodiment shown, pipe 2 is constructed of predominantly or substantially nonconductive (e.g., nonferrous) materials. Such a nonconductive pipe could include polymer (e.g., PVC) pipes, ceramic (e.g., vitrified clay) pipes, concrete pipes, fiberglass pipes, asbestos cement pipes, and other conventional and future developed nonconductive pipe materials. Substantially nonconductive pipes will include pipes (such as concrete) which may have metal reinforcing (rebar) members. It is only necessary that the rebar (or other conductive material) is spaced sufficiently far apart that a "window" between the rebar is available to the transmitted and returning signal.

It will be understood that in the embodiment of FIG. 1, transmitter/receiver unit 1 is positioned within pipe 2 such that the unit may rotate with respect to pipe 2. In this embodiment, transmitter/receiver unit 1 rotates on pivot point 8, which could be a rod or other element supporting transmitter/receiver unit 1 in the approximate center of pipe 2, allowing the unit to rotate freely in the interior of pipe 2. This embodiment of transmitter/receiver unit 1 generally comprises a transmitter antenna 5, a receiver antenna 6, and operating circuitry 7 (described in more detail below). There is no necessity for the antennas 5 and 6 to be a particular distance from the inner pipe wall. However, in a preferred embodiment, the antennas 5 and 6 will be at least 1 or 2 cm (or more preferably at least 5 to 6 cm) distant from the pipe wall in order to avoid deviations from the pipe's standard inner diameter which may be caused by off-set pipe joints, degradation of the pipe, roots or other intrusions into the pipe wall, mineral deposits, or biological growths on the pipe wall. Allowing a substantial air gap of at least 1 or 2 cm from the pipe wall helps insure antennas 5 and 6 will be able to move freely both in a lateral (or axial) direction (i.e., down the length of the pipe) and in the rotational (or 'hoop') direction (i.e., relative to the internal circumference of the pipe).

Although certain embodiments allow antennas 5 and 6 to rotate 360° to obtain reflections from the entire circumference of pipe 2, other embodiments could also rotate antennas 5 and 6 less than 360°. For example, the antennas could rotate through any arc between 60° and 360°. Likewise, although the embodiment of FIG. 1 implies that operating circuitry 7 rotates with the antennas 5 and 6, this is not necessary in other embodiments and operating circuitry 7 could be fixed with only antennas 6 and 7 rotating. Other embodiments will feature one or more fixed antennas that are positioned such as to transmit towards the pipe's crown, invert or in another orientation towards the pipe inner wall.

Figure 2A:
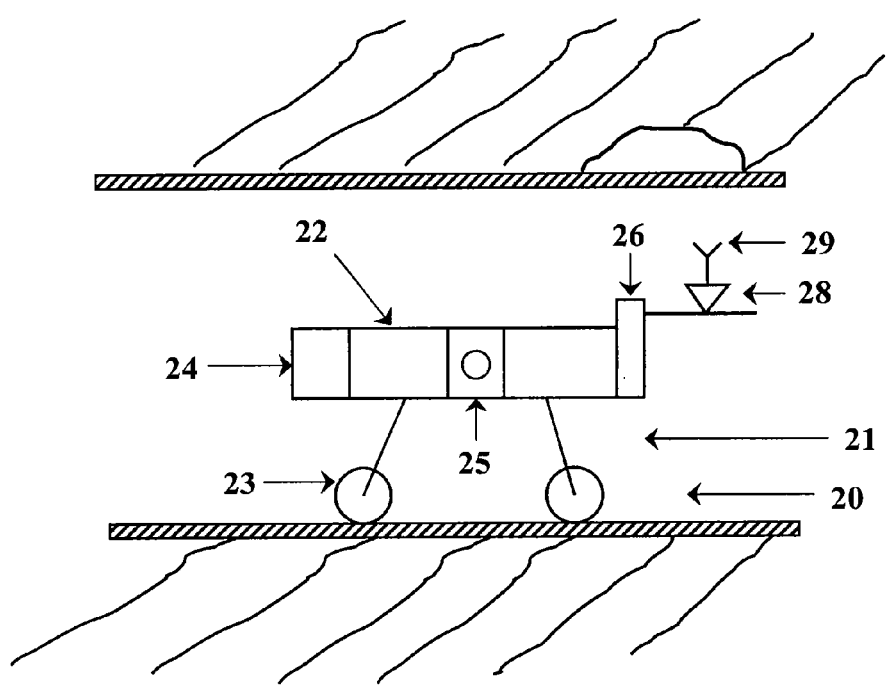
FIG. 2A illustrates a robotic transporter which may be employed in one embodiment of the present invention.

In one particular embodiment, the transmitter/receiver unit will be carried through the conduit by a robotic transporter 20 such as seen in FIG. 2A. Robotic transporter 20 generally comprises a carriage assembly 21 having a frame 22, and wheels 23. Although not explicitly shown in FIG. 2A, it will be understood that a drive mechanism powers wheels 23 such that the robotic transporter can move forward and backwards. The particular drive mechanism employed is not critical and many conventional hydraulic or electric drive mechanisms (e.g., wheel or track-based) or future developed drive mechanisms may be suitable. Likewise, the power for the drive mechanism may be onboard batteries, a power cord supplying power (e.g., electrical, hydraulic, or pneumatic) from a remote source, or any other conventional or future developed means of powering the drive mechanism. One example robotic transporter 20 may include the Pipe Ranger available from CUES Corporation of Orlando, Fla. The antennas 5 and 6 described in FIG. 1 would be positioned on antenna mount 26 and the operating circuitry 7 in frame 22. Antenna mount 26 may include a motor for rotating antennas 5 and 6. Frame 22 may also include a rotating CCTV camera 25 and a rotating laser profiler 24. Laser profiler 24 employs a laser beam to measure the distance from the profiler to the inner pipe wall. The laser beam may rotate 360° and provide a two dimensional outline of the pipe's cross-section at any given point along the length of the pipe. Acceptable laser profilers are also available from CUES Corporation and C-Tec of Quebec, Canada.

Figure 2B:
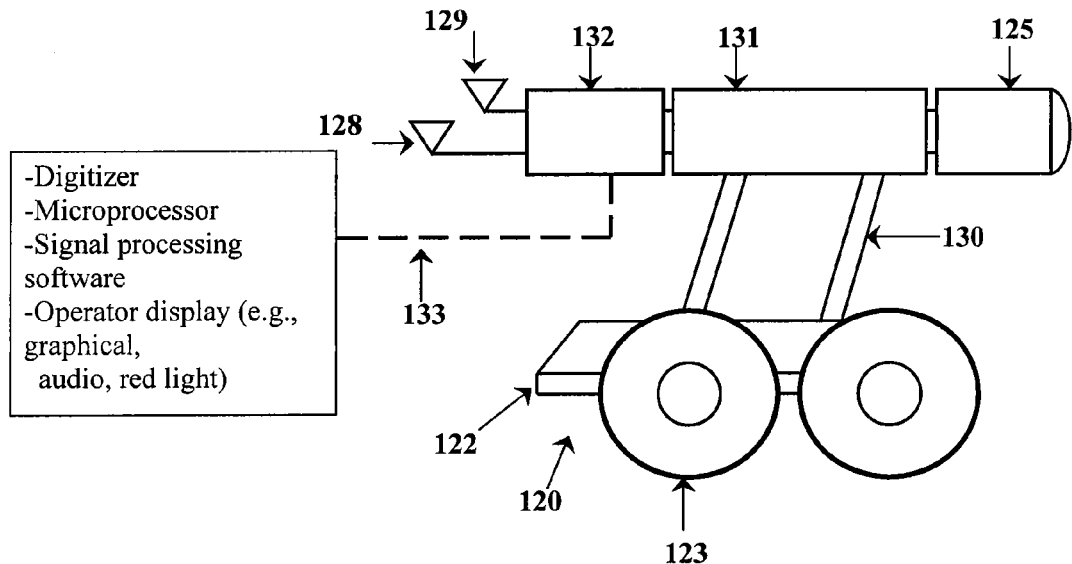
FIGS. 2B and 2C illustrate an alternative robotic transporter.

FIG. 2B illustrates another example of a robotic transporter. Robotic transporter 120 is similar to the Pipe Ranger device listed above. Transporter 120 has a frame 122, wheels 123, and a body segment 131 mounted above frame 122 by positioning arms 130. Transporter 120 may be powered by any of the above methods discussed in regards to transporter 20. In certain embodiments, body segment 131 will be capable of pivoting forward or rearward on positioning arms 130. Although not shown, a mechanically operated lifting device could operate to raise (pivot forward) and lower (pivot rearward) body segment 131. In some embodiments, the pivoting motion of body segment 131 will be remotely controlled, but in other embodiments, it could be manual (e.g., the body segment 131 is locked into the upright position prior to the transporter entering the conduit). The forward end of body segment 131 will have a rotating camera 125 and the rearward end will have a sensor hardware housing 132 positioned thereon. Sensor hardware housing 132 will enclose the circuitry associated with a pulse generator, a down converter, and a low noise amplifier. The housing 132 may be constructed of any appropriate material such as metals, ceramics, thermoplastics, or thermosetting materials. A power/communications cable 133 will extend from housing 132 back to the surface to connect with hardware such as an A/D converter and a microprocessor(s) running signal processing software and graphical software, one example of which is explained in more detail below. The signal carrying component of cable 133 may be coaxial, fiber optic, or other cable type.

Figure 2C:
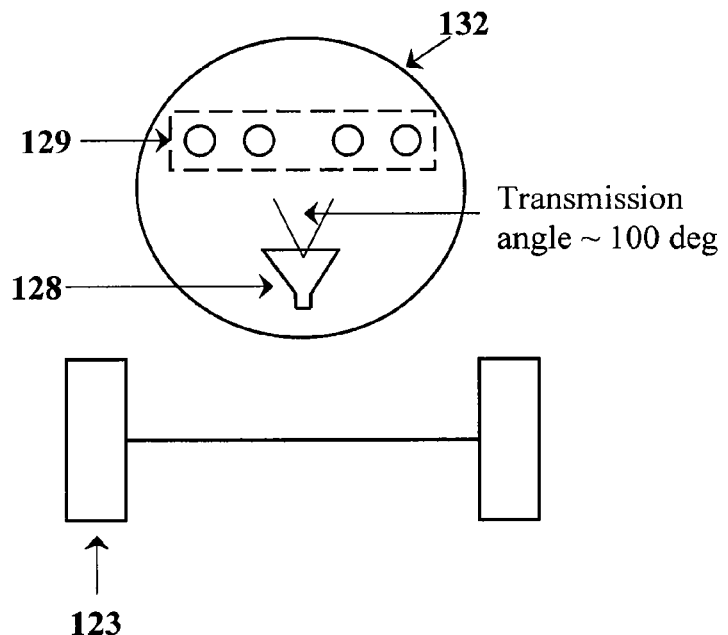

In the device of FIG. 2B, the transmitting antenna 128 and receiving antenna 129 are positioned outside the housing 132. The schematic end-view in FIG. 2C illustrates how the transmitting antenna 128 is position behind (relative to the direction of transmission) the receiving antenna 129. The housing 132 will be capable of rotating to allow the antennas to send and receive signals along the entire circumference of the conduit, although the antennas could rotate independently of housing 132, preferably with the antennas maintaining their alignment of the transmitting antenna being behind the receiving antenna. However, the exact manner in which the antennas are constructed to rotate is not critical. In the embodiment of FIG. 2C, the transmitting antenna 128 is a Vivaldi antenna and the receiving antenna 129 is an array of Discone antennas (explained in more detail below).

In a preferred embodiment of the invention, the signal transmitted from antenna 5 will be an ultra-wide bandwidth (UWB) signal. In one embodiment, an UWB signal is defined as a signal where the occupied bandwidth is greater than 25% of the center frequency or greater than 1.5 GHz. Example signal parameters could include a frequency range of about 1 to about 30 GHz (or any range therebetween) and includes specific subrange examples such as about 1 to 15 GHz, about 3 to 9 GHz, and about 20 GHz to 30 GHz. As used herein, a UWB signal transmitting in a certain range (e.g., 3 to 9 GHz) or "between" 3 and 9 GHz is transmitting with a center frequency somewhere between 3 and 9 GHz, but is not necessarily using the entire bandwidth between 3 and 9 GHz. In one embodiment, the pulse width or duration will be considered the time that the amplitude of the pulse remains above one half of the maximum amplitude of the pulse. The pulse duration of the signal will typically be less than 500 nsec (or any range below 500 nsec), including specific example pulse length ranges of less than about 500 psec, less than about 100 psec, or about 1 to 100 psec. The number of pulses per second (pulse repetition frequency) will typically be greater than about 100 (but could be less than 100), including example subranges of about $10^3$ to $10^6$ pulses/sec or about $10^3$ to $10^5$ pulses/sec or any range as long as the number of pulses per second does not interfere with the pulse duration. In many embodiments, the signal transmitted will be a time domain UWB pulsed signal with many different possible shapes. Non-limiting examples of a time domain UWB pulsed signal could be a variant of a Gaussian impulse and its derivatives, a Sinc signal or an Edge signals. As used herein, a time domain UWB pulsed signal means a signal where the gap between the consecutive pulses are at least two orders of magnitude greater than the width of the pulse. Certain time domain UWB pulsed signals employed with the invention are characterized by having consecutive pulses with identical (or substantially identical) wave forms for a given pulse width and frequency.

Figure 3A:
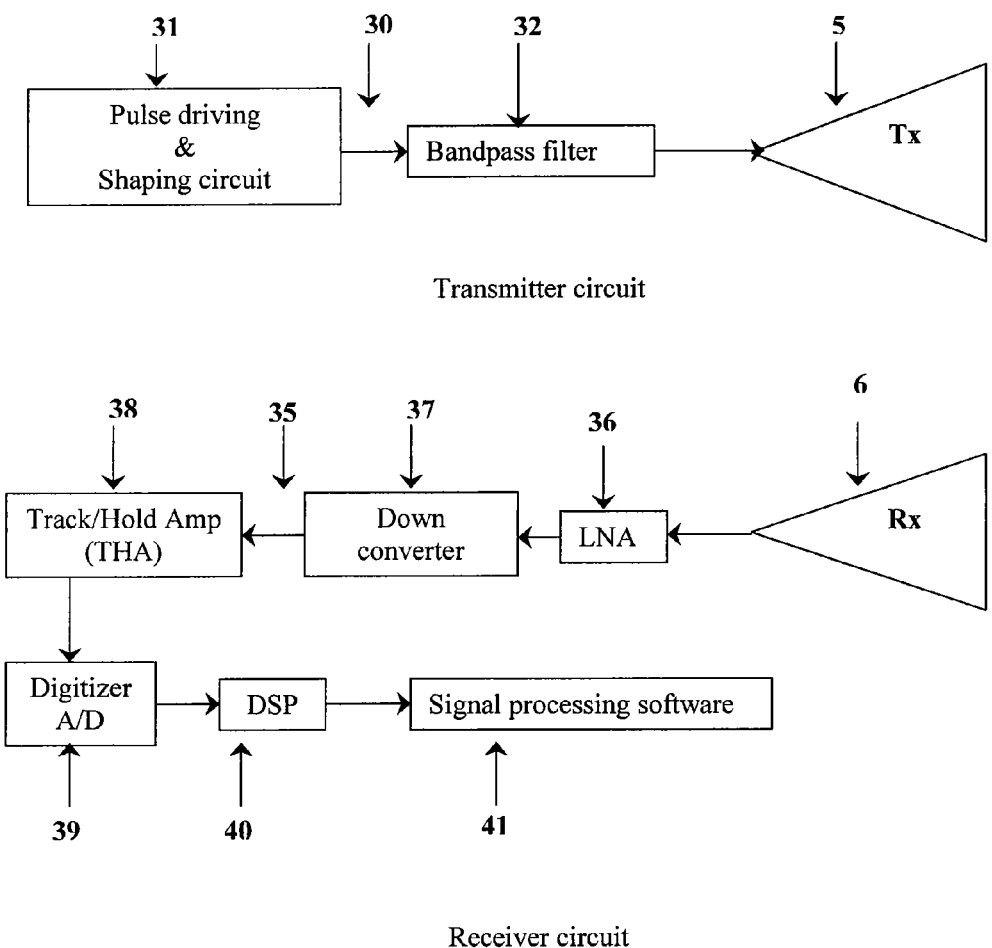
FIG. 3A is a schematic diagram of one embodiment of transmitter and receiver circuitry used in the present invention.
Figure 3B:
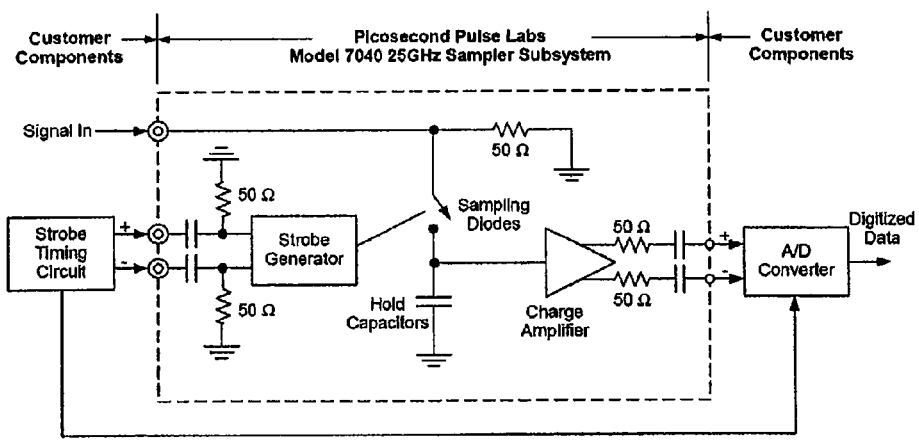
FIG. 3B is a circuit diagram of one embodiment of a track and hold amplifier.
Figure 3C:
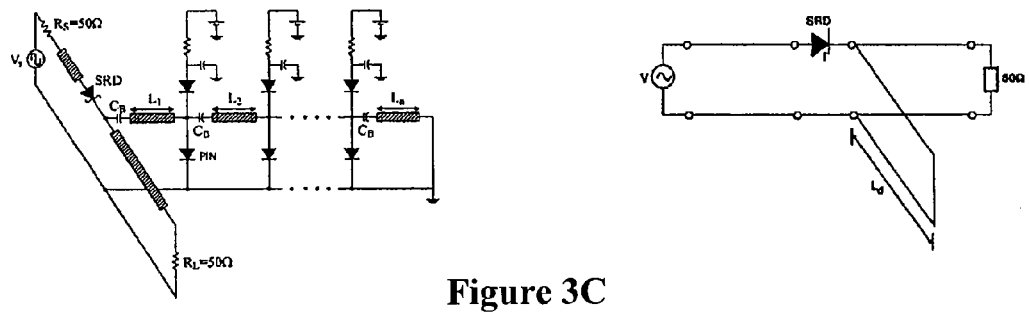
FIG. 3C is a circuit diagram of one embodiment of a tunable pulse generator.
Figure 4:
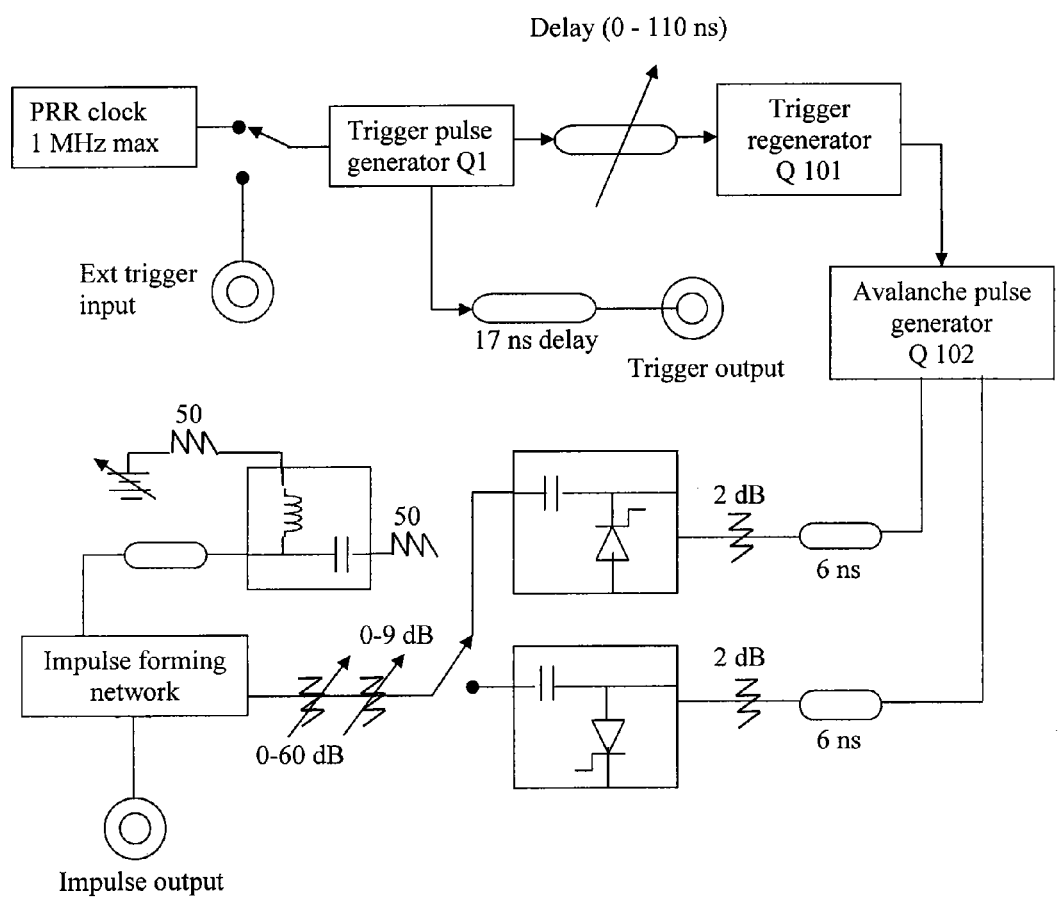
FIG. 4 is a more detailed circuit diagram of the transmitter circuit illustrated in FIG. 3.
Figure 5:
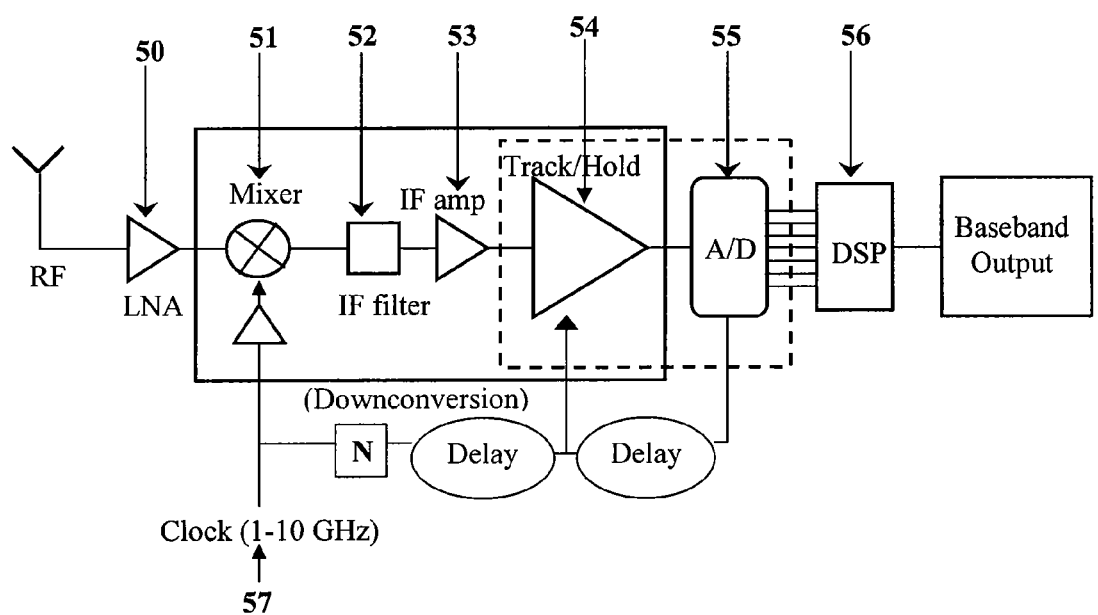
FIG. 5 is a more detailed circuit diagram of the receiver circuit illustrated in FIG. 3.

One example of transmitting and receiving circuitry employed in the present invention is shown in FIGS. 3 to 5. FIG. 3A illustrates a transmitter circuit 30 comprising a pulse driving circuit 31, a bandpass filter 32, and a transmitting antenna 5. An example of a suitable pulse driving circuit is seen in FIG. 4 and is available from Picosecond Pulse Labs of Boulder, Colo. In many cases, the pulse driving circuit 31 may produce a signal in a broader bandwidth than desired (e.g., because governmental bandwidth regulations specify a certain bandwidth or because of other limitations). In such cases, the bandpass filter 32 will be used to limit the bandwidth (e.g., to about 3-10 GHz in this example) of the signal sent to transmitting antenna 5. Although narrower bandwidths may be used, typically the widest bandwidth allowed by governmental regulations will be employed in order to maximize the amount of signal information. One example of a suitable bandpass filter is disclosed in Keren Li, "UWB Bandpass Filter: Structure, Performance and Application to UWB Pulse Generation" Microwave Conference Proceedings, APMC 2005, Asia-Pacific Conference Proceedings, Vol 1, December 2005, which is incorporated by reference herein. However, many different conventional or future developed bandpass filters could be employed. This pulse driving circuit will produce a pulse in a 1 kHz to 10 GHz bandwidth (filtered from 3 GHz to 10 GHz in this example) with a pulse duration of about 65 to 75 psec.

The receiver circuit 35 of FIG. 3A generally comprises low noise amplifier 36, down converter 37, track and hold amplifier 38, analog-to-digital converter 39, and digital signal processor 40. Typically, the signal obtained from digital signal processor 40 will be sent to some type of signal processing software 41, one example of which is described in more detail below. Circuit elements 36 to 40 may be considered the signal acquisition circuitry which acquires the signal prior to sending the signal to processing software 41. Naturally, many other alternative examples of signal acquisition circuitry could be employed with the present invention. FIG. 5 is an example circuit having all the elements of receiver circuit 35 and is produced by Picosecond Pulse Labs. LNA (low noise amplifier) 50 is located close to the receiver antenna and amplifies the signal with low distortion and noise. Mixer/down converter 51 translates the higher frequency signal into a spectrum with a lower frequency. Sample clock 57 times the sampling of the received signal which is followed by IF filter (intermediate frequency filter) 52 and IF amp (intermediate frequency amplifier) 53. THA (track and hold amplifier) 54 is a device that samples the incoming analog signal to convert it into digital format. The THA specifically holds the sampled signal to a constant value for a particular time until the analog signal is converted into digital form by the A/D converter 55. One THA device, a Model 7040, 25 GHz band width (14 picoseconds rise time) sampling head (Picosecond Labs, Boulder, Colo.), is shown in FIG. 3B. An example of an analog to digital converter which could be employed with this THA device is the AD9432 12-bit 10 MSps ADC offered by Analog Devices, Inc. (Norwood, Mass.). The strobe timing circuit can be accomplished using a programmable delay line (PADL) such as PDL-100A offered by Colby Instruments (Bellevue, Wash.) or the PDDL10 10 Gb/s programmable digital delay line manufactured by GigaBaudics of Santa Barbara, Calif. Thereafter, DSP (digital signal processor or processing circuitry) 56 digitally calibrates and corrects operations of the sampled signal before the signal is sent to further software processing. The signal which comes out of this DSP circuitry (baseband signal) is typically sent to a microprocessor where it is passed through an appropriate algorithm (an example of which is discussed below in reference to FIG. 13) to extract the target information. Nonlimiting examples of DSP processors could include the OMPA application processors made by Texas Instruments Inc, of Dallas, Tex., including the OMAP35x and OMAP-L1x; the PowerPC® 405 processor core manufactured by IBM of Armonk, N.Y.; and the XScale microprocessor cores manufactured by Marvell Technology Group of Santa Clara, Calif. This receiver circuit has a DC to 100 GHz RF bandwidth at a sampling rate exceeding 10 giga samples per second (GS/sec).

In certain embodiments, the pulse generator may transmit one signal having a fixed set of parameters (e.g., bandwidth, pulse duration, number of pulses/sec, etc.). However, in other embodiments, it may be desirable to transmit signals having different parameters. Pulses with longer duration can penetrate deeper into the surrounding soil than shorter duration pulses. However, shorter duration pulses provide better resolution. For example, a 70 psec pulse will be capable of detecting two different interfaces about a centimeter apart. This would allow for the potential detection of changes in the conduit wall thickness or other defects in the conduit wall. On the other hand, a longer duration pulse (e.g., several hundred psec) is better suited for detecting a void several centimeters across which is located outside the conduit.

Therefore, certain embodiments may employ an adjustable pulse generator which produces one signal with a comparatively short duration (e.g., less than 100 psec or less than 50 psec) and a second signal with a longer pulse duration (e.g., between 100 and 500 psec). Of course, these are only example pulse duration ranges and many larger or smaller ranges could be used as alternatives. FIG. 3C illustrates an electrically tunable pulse generator capable of generating a range of pulse widths using a single device; such a device is described in more detail in IEEE Microwave and Wireless Components Letters, Vol. 14, No. 3, March 2004, which is incorporated by reference herein in its entirety.

As an alternative to an adjustable pulse generator, other embodiments could employ two separate pulse generators, each having a fixed pulse duration (e.g., shorter and longer). Nor is the invention limited to employing one or two different signals, but could employ three or more signals if the particular application warrants.

A similar situation is observed with frequency ranges. For example, a frequency range within 3-10 GHz and duration of about 65 psec will provide a resolution of about a centimeter and will penetrate beyond the walls of the conduit. However, in certain applications, such as where the conduit has an few millimeter thick internal polymer liner and it is desired to detect defects in the liner (e.g., changes in thickness; the presence of a micro-annulus between the liner and the pipe's inner wall; or a quality of liner installation issue), a resolution of less than a centimeter may be required. In these cases, frequency ranges greater than 20 GHz (e.g., 20-30 GHz or potentially higher and a pulse duration of about 45 psec) may be more effective in obtaining millimeter and sub-millimeter resolutions. Therefore, some embodiments may employ pulse generators in the 3 to 10 GHz range, some in the 20-30 GHz range, and some employ pulses in both ranges (or even three or more frequency ranges). Likewise, the invention is not limited to 3 to 10 GHz or 20 to 30 GHz ranges, but could employ 1-5 GHz, 5-10 GHz, 18-23 GHz, 15 to 35 GHz, or any other range compatible with signal acquisition circuitry. Typically, governmental regulations will dictate the frequency range more than technical limitations.

Once a reflection has been received and operated upon by the receiving circuitry, it will be transmitted to a station on the ground surface outside the conduit. In preferred embodiments, a transmission line may run from the ground surface and trail behind the robotic transporter 20 (FIG. 2A) as the transporter 20 moves down the conduit. In other embodiments, the processed reflection signal may be transmitted outside the conduit by radio signals. Any conventional or future developed method of sending this information out of the conduit could be employed.

Figure 6A:
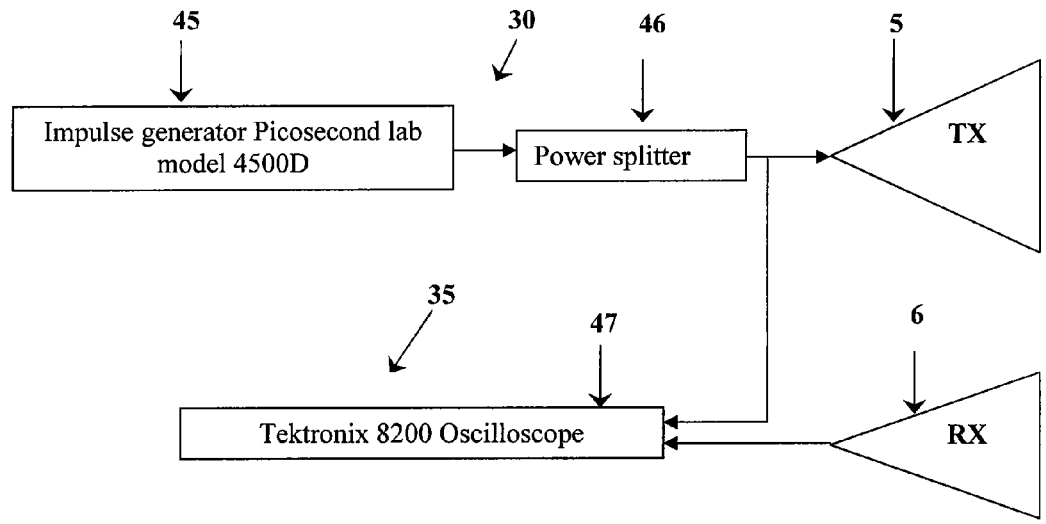
FIG. 6A is a schematic diagram of another embodiment of transmitter and receiver circuitry used in the present invention.
Figure 6B:
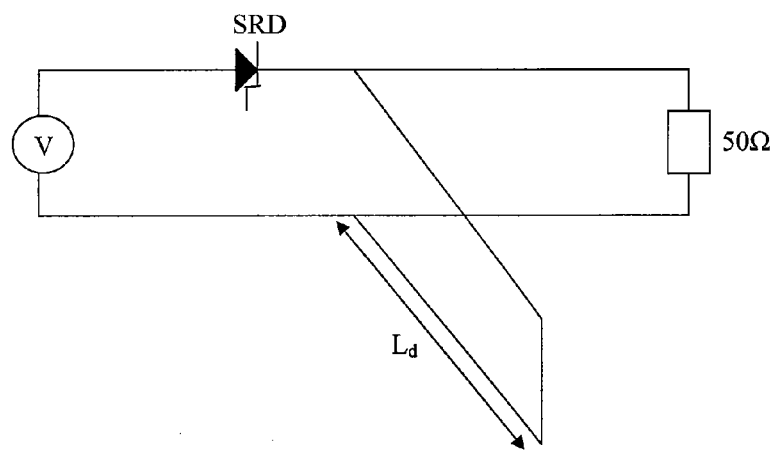
FIG. 6B illustrates an alternative pulse generator design.

Although FIGS. 3 to 5 illustrate an example of circuitry suitable for used in the robotic transporter 20 seen in FIG. 2A, there are many different ways in which a signal could be produced and its reflection capture in the present invention. As another example, FIG. 6A shows transmitter circuit 30 comprised of a convention bench-top pulse generator 45 such as the model 4500D produced by Picosecond Pulse Labs. The signal produced by pulse generator 45 will be sent to transmitter antenna 5 as well as the receiving circuit 35 (via power splitter 46). In this embodiment, the receiving circuit is a conventional bench-top oscilloscope such as the model 8200 available from Tektronix, Inc. of Beaverton, Oreg. Although moving bench-top equipment along the length of a conduit may require a large transporting device, such an embodiment is not necessarily impractical given the large diameter (3 to 12 feet or possibly larger) of the sanitary sewer or storm water conduits which could be inspected with the present invention. Nor is it necessary that all elements of the transmitting and receiver circuits be positioned within the conduit. In certain embodiments, it may be possible for fewer elements (e.g., the antennas) to be positioned in the conduit and the signals transmitted (by the methods described above) to the remaining circuitry outside the conduit.

It will be understood that the means in FIGS. 3-6 for generating and transmitting a signal and receiving its reflection are merely examples. Any number of conventional or future developed circuits capable of generating and receiving signals within the above described parameters should be considered within the scope of the present invention. For example, the AVP-3S-C pulse generator available from Avtech Electrosystems, Ltd. of Ogdensburg, N.Y. is capable of generating pulses with variable widths ranging from 200 picoseconds to 2 nanoseconds at repetition rates of up to 1 MHz. Another example is shown in FIG. 6B which illustrates the schematics of a pulse generator utilizing step-recovery diodes (such as these manufactured by Aeroflex Metelics Inc. of Sunnyvale, Calif.) which can be used to generate 100 picoseconds pulses. In FIG. 6B, V is a frequency generator voltage source capable of producing the frequencies that act as the trigger to the rest of the pulse generator circuit and the receiver circuit (for example, see the trigger line in FIG. 3A or the power splitter-oscilloscope line in FIG. 6A). Ld represents a delay line for tuning the pulse generator to vary the pulse widths. For different delay line lengths, different pulse widths are produced. This delay line is one method of adjusting the tunable pulse generator discussed in reference to FIG. 3C.

An example of the source V could be a temperature compensated voltage controlled oscillator (TC VCXO) where "VC" indicates that the frequency the source is generating can be controlled by an externally applied voltage. By electronically controlling the voltage, the frequency of V may be controlled and thereby controlling the number of pulses generated per second by the transmitter circuit (i.e., the pulse repetition frequency described above). An example of one suitable VCXO is the TFS2 series product from Ascend Frequency Devices of Newport Beach, Calif.

Figure 7:
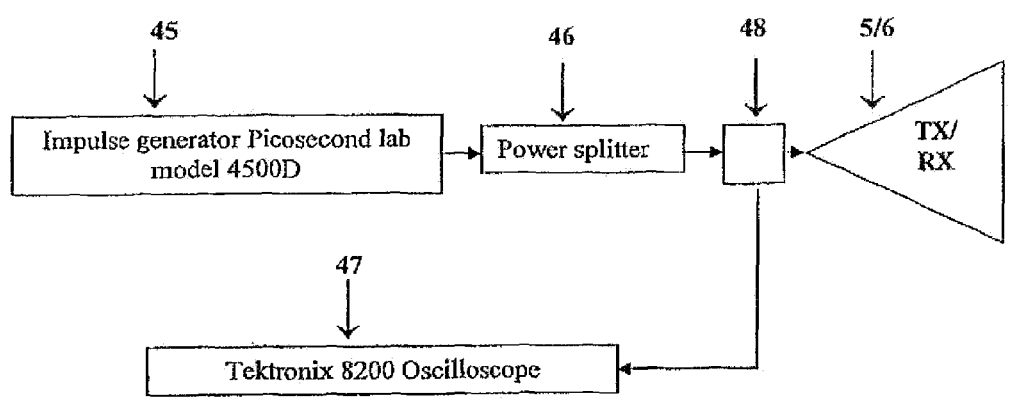
FIG. 7 is a schematic diagram of another embodiment which employs a single antenna.

While previously described embodiments illustrate separate transmitting and receiving antennas, FIG. 7 illustrates a hypothetical embodiment where a single antenna serves as both the receiving and transmitting antenna. In this embodiment, the pulse duration must be short enough and the time between pulses long enough such that the reflection from the previously sent pulse is received before the next pulse is transmitted. However, such an embodiment would also require a high speed switch 48 to alternately couple the antenna to the transmitting and receiving circuitry and switches operating in the picosecond range may be currently difficult to implement. Nevertheless, future development of a practical high speed switch would make this embodiment feasible.

Figure 8:
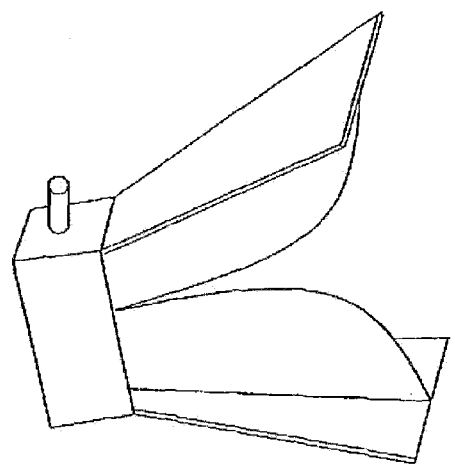
FIG. 8 illustrates one type of directional antenna.

The transmitter antenna 5 and receiver antenna 6 could be of any number of conventional or future developed configurations. The transmitter and receiver antennas 5 and 6 may be of the same type or may be of different types. Nonlimiting examples of antenna types may include bow-tie antennas, planar dipole antennas, microstrip patch antennas, transverse electromagnetic (TEM) horn antennas (two parallel plates isolated from one another), quasi-TEM antennas, discone antennas, rod antennas, and Vivaldi antennas (a flat plate with a slot which opens following a second order or higher curve). In one embodiment, transmitter antenna 5 will be a "directional" antenna which generally concentrates transmission power in a specific direction or over a more limited angle such that coverage distance increases at the expense of coverage angle. For example, the directional antenna may transmit energy over an arc of less than 90° (or any lesser angle between 0° and 90°). More preferred embodiments include directional antennas transmitting energy over an arc of less than 60° or alternatively less than 30°. FIG. 8 illustrates one type of directional antenna, a TEM double ridge horn antenna, which could be employed in the present invention. The dimensions of an antenna are generally related to the frequency of the wave emitted; the lower the frequency, the larger the antenna's dimensions. As a nonlimiting example, an antenna such as seen in FIG. 8 designed to transmit in the 3 to 8 GHz range would mount on a transporter, with the receiver antenna being as large as practical while still being capable of rotating within the conduit. A similar miniature ridged pyramidal horn operating in the 1-11 GHz range can be seen in Xu, et. al, *Numerical and Experimental Investigation of an Ultrawideband Ridged Pyramidal Horn Antenna With Curved Launching Plane for Pulse Radiation*, IEEE Antennas and Wireless Propogation Letters, vol. 2, 2003, which is incorporated by reference herein.

Figure 9A:
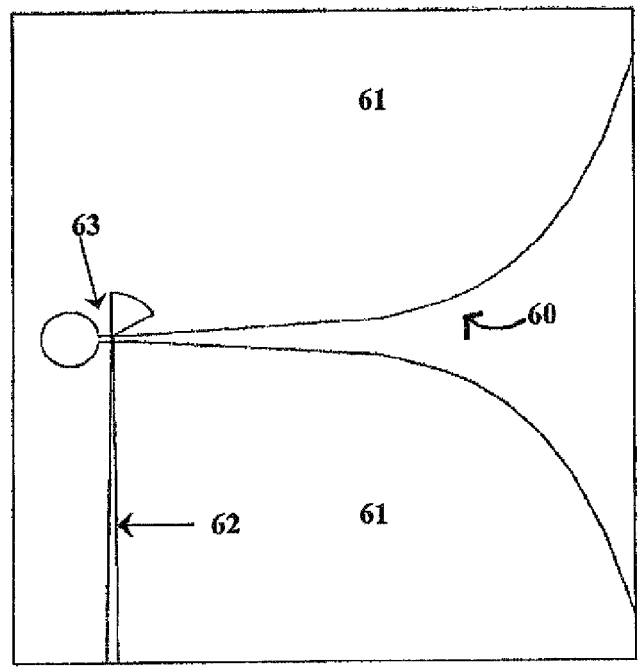
FIG. 9A illustrates another type of directional antenna.

Another directional antenna which could be employed with the present invention is the Vivaldi antenna 60 seen in FIG. 9A. This small planar antenna may have dimensions of 110 mm×120 mm and will generally comprise the antenna ridges 61, the microstrip impedance line 62, and the microstrip-to-slotline transition section 63. Such an antenna adapted for a 3.1 to 10.6 GHz frequency band is disclosed in more detail in Piksa, P., Sokol, V.: *Small Vivaldi Antenna for UWB*, Radioelektronika 2005—Conference Proceedings. Brno: VUT v Brně, FEI, Ústav radioelektroniky, 2005, p. 490-493, which is incorporated by reference herein.

Figure 9B:
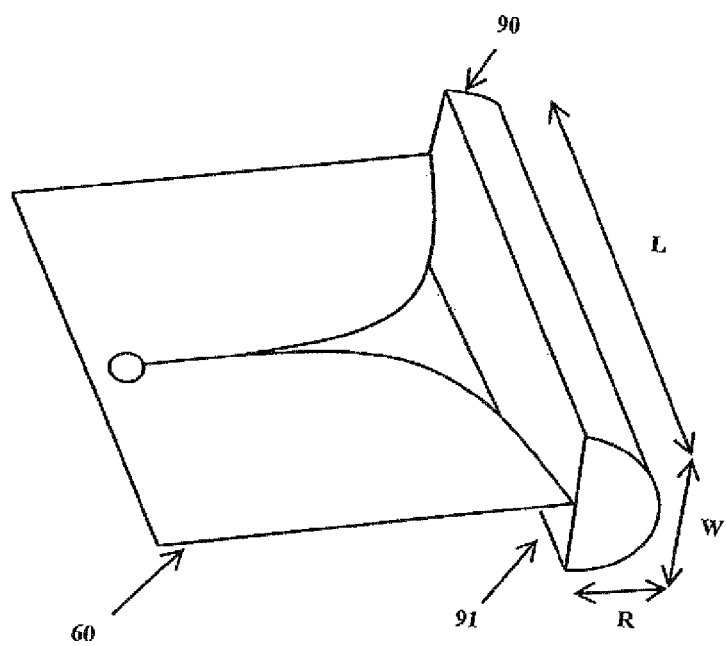
FIG. 9B illustrates a modification to the antenna of FIG. 9A.

FIG. 9B illustrates a Vivaldi antenna 60 modified with a dielectric lens 90. The dielectric lens will refract electromagnetic/radio waves in a similar manner to optical lens refracts light waves, e.g., the dielectric lens transform the spherical wave front from the source point to a planer wave front after passage through the lens, resulting in a high-directivity pattern. As seen in FIG. 9B, dielectric lens 90 takes on a half cylinder shape of homogeneous dielectric constant with a flat rear or wave entry surface 91 which is perpendicular to the direction of wave travel and a curved front or wave exiting surface 92. The embodiment shown in FIG. 9B will have a length "L" of 110 mm and a radius "R" of 25.4 mm. None limiting examples of materials from which lens 90 could be formed include Teflon, Silicon and C-STOCK 265 (epoxy plastic resin and glass microspheres loaded with a capacitive filler to achieve the desired dielectric behavior). However, the dielectric lens could be formed of many alternative materials and could take on many alternative shapes such as hemispherical, curves without a constant radius, or even flat geometries. In these alternative flat geometries, the dielectric properties of the lenses may be varied in order to accomplish the refraction effect on the in coming EM energy.

Figure 9C:
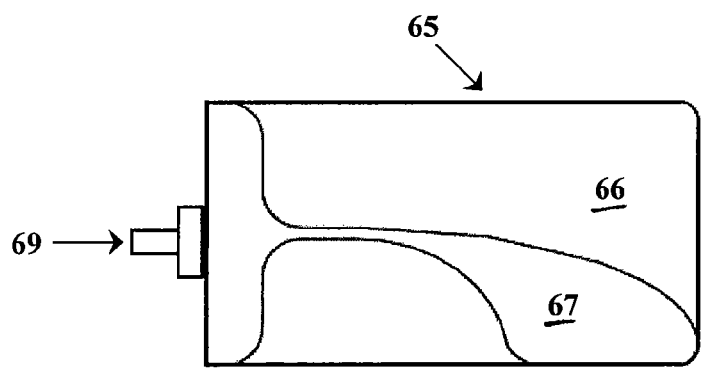
FIGS. 9C and 9D illustrate a further type of directional antenna.
Figure 9D:
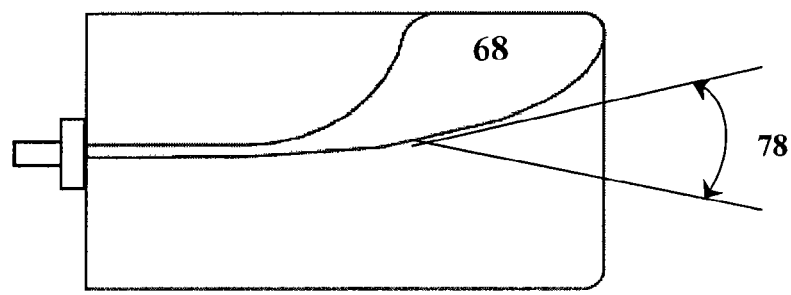

FIGS. 9C and 9D illustrate another embodiment of a Vivaldi antenna. In FIG. 9C, Vivaldi antenna 65 generally comprises a dielectric material forming base 66, a layer of conductive material forming first lobe 67 and on the opposite side of base 66 (FIG. 9D), another layer of conductive material forming second lobe 68. Although base 66 may be formed of many dielectric materials, nonlimiting examples include epoxy or fiberglass. Alternatively, Teflon may form a more suitable material for base 66 when the antenna is designed for higher frequencies (e.g., above the one (1) GHz range). In the embodiment of FIG. 9C, the base 66 is approximately 2 mm thick, 10 cm in length, and 5 cm in width. Naturally these dimensions can vary for different antenna designs. The antenna lobes 67 and 68 may be formed of many conductive materials, one example of which is copper, while other examples could include aluminum, brass and gold plated copper or titanium. In FIGS. 9C and 9D, the copper layers forming lobes 67 and 68 are approximately 0.1 mm thick with the taper profile governed by a polynomial equation such as described in NASA Technical Memorandum 107445, Characterization of Miniature Millimeter-Wave Vivaldi Antenna for Local Multipoint Distribution Service, by R. Simons and R. Lee and presented at the 49th Automatic RF Techniques Group Conference, Denver, Colo., Jun. 13, 1997, p. 1, which is incorporated by reference herein in its entirety. However, the conductive lobes could take on many different shapes and the exact shape can vary as an optimization (or sub-optimization to the degree acceptable) for a particular board material and thickness, frequency range and type of connection/feed-line. FIG. 9C further illustrates how a feed line 69 connects the two lobes and allows signal input to the antenna. The embodiment of FIGS. 9C and 9D has a transmission arc 78 of approximately 70 degrees. Although described above as a directional transmitting antenna, the antenna of FIGS. 9C and 9D could also act as a receiving antenna.

Figure 10:
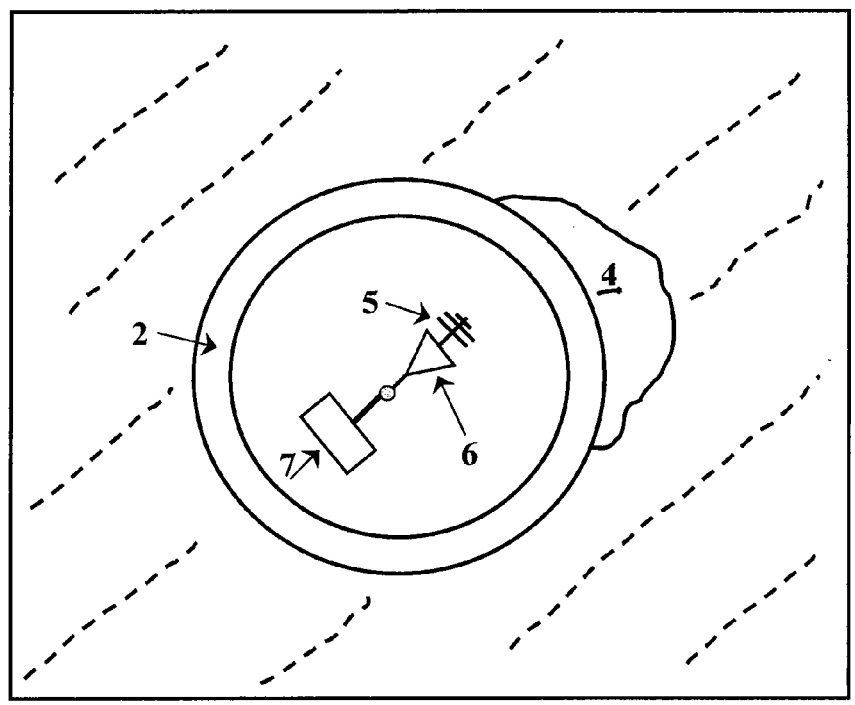
FIG. 10 illustrates one example of an in-line antenna configuration.

As suggested in FIG. 10, one embodiment of the invention will comprise a substantially in-line antenna configuration. FIG. 10 shows a transmitter antenna 5 (e.g., a log periodic antenna, a TEM horn or Vivlaldi antenna) and a TEM Horn receiver antenna 6. The antennas are positioned radially in-line with a wall of the conduit, i.e., in a line running radially from the center of the conduit to the wall of the conduit in FIG. 10. In an alternative embodiment, a horn receiving antenna is positioned behind a smaller Vivaldi transmitting antenna. In this example, the use of a smaller Vivaldi antenna blocks less of the return signal traveling to the receiver antenna. Additionally, the in-line configuration is not limited to the example of FIG. 10 and the substantially in-line configuration is intended to include any configuration where the receiver and transmitter antenna are in-line or positioned very close together (e.g., side by side) such that there is the potential for considerable cross-talk or cross-coupling between receiver and transmitter antennas if transmission and receiving cycles are not clearly delineated. For example, the embodiment of FIG. 7 showing a single antenna should be considered a substantially in-line antenna configuration. The side by side configuration may be preferable when transmitting toward a flat surface, e.g., a bunker wall as opposed to a curved interior surface of a pipe. The configuration of FIG. 10 is not necessarily limited to use of a directional transmitter antenna, but a better quality signal reflection is likely to be received using a directional antenna. Various embodiments include examples where both the transmitter and receiver antennas are directional, both of the antennas are nondirectional, and where one of the receiver or transmitter antenna is direction and the other is not. Other embodiments could include a single transmitter antenna and multiple receiver antennas (or visa versa). For example, where two signals in different frequency ranges are being transmitted, it may be advantageous to have different antennas configured to maximize signal transmission in each frequency range.

Figure 14A:
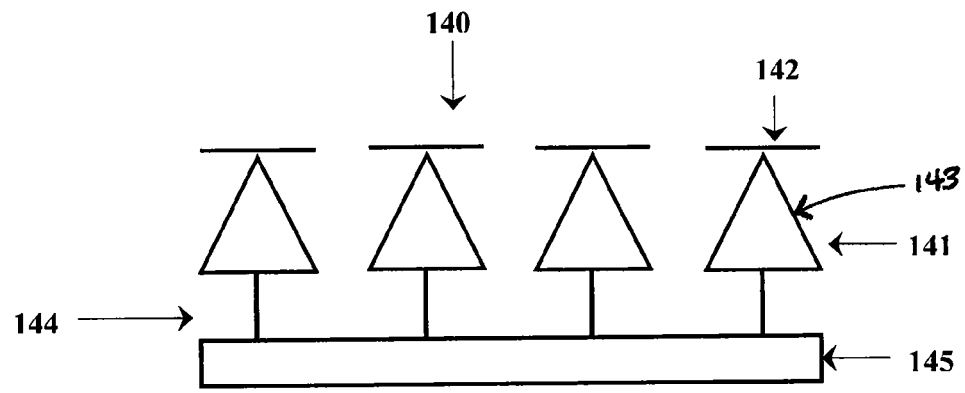
FIGS. 14A to 14C illustrate a still further antenna configuration.
Figure 14B:
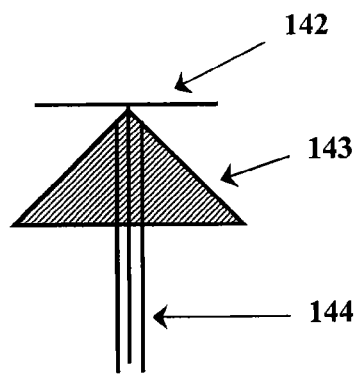
Figure 14C:
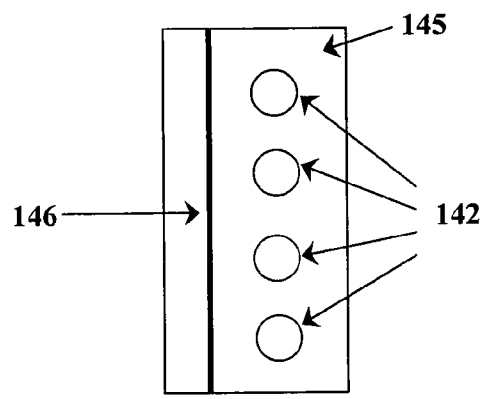

Another antenna configuration is seen in FIGS. 14A to 14B. FIG. 14A illustrates an array 140 of discone-type antennas 141. Discone antennas are conical shaped, vertically polarized antennas consisting of a flat disc 142 with the disc plane horizontal to and mounted on top of the cone 143. The disc is insulated from the cone using air gap or otherwise. In the embodiment shown, the air gap is maintained by separating disc 142 from cone 143 by means of stem 144.

In certain embodiments, the disc 142 will have a diameter of about 0.17 the wavelength at the lowest desired frequency. The height of the cone will be approximately 0.25 of the wavelength at the lowest desired frequency. The discone antenna may be fed with a 50 ohm cable passing through stem 144, the outer conductor being connected to the cone and the center conductor to the disc. A cone angle of 30 degrees may be used in one embodiment, but other embodiments could use a cone angle of between 25 and 40 degrees (or possibly a wider range). The cone can be made of solid metal, sheet metal or metal rods (aka radials). Example metals include copper, aluminum, steel and brass or alloys of the same. Preferably, discone antennas are designed such that the higher frequency limit is approximately equal to three times the lower cutoff frequency.

The array 140 of discone antennas 141 may be used for either receiving or transmitting purposes. The array may include 2, 3, 4, 5 or any larger number of discone antennas that are practical. As suggested above, the dimensions of the antenna are typically governed by the wavelength of the lower desirable ('cut-off') frequency and are optimized for the desired application. Zhang and Brown (Zhang, Y and A. K. Brown, 2006. "The Discone Antenna in a BPSK Direct-Sequence Indoor UWB Communication System," *IEEE Trans. On Microwave Theory and Techniques*, Vol. 54, No. 4, April 2006, pp. 1675-1680, which is incorporated by reference herein), proposed one such discone antenna for the frequency region of 3.1-10.6 GHz, shown in FIG. 14B. The distance between the antenna elements may vary depending on the application. One embodiment uses a separation distance of 11 mm between the edges of two adjacent cones. In some cases, it may be beneficial to place a thin strip of conductive material (a reflector) behind the discone antenna array. The strip of conductive material (e.g., metal) serving as a reflector is approximately the height as the antenna elements or possibly higher depending on distance from the antenna. The reflector serves as to radiate all the transmitted energy in one direction, thus over coming the omnidirectional characteristic of typical discone antennas and improving the directivity of the discone antenna array. The reflector is positioned behind the antenna array. The separation distance depends on the application at hand. Example models have utilized separation distances ranging from about 5 to 100 mm, however, other separation distances can be used.

In an alternative embodiment, the array 140 of discone antennas can be employed in a phased array system. In such a phased array system, the direction of the signal transmission may be altered by changing the phase of the input signal fed to the individual antennas of the array. Thus, by changing the phase of the input signal fed to the individual antennas in the array, the direction of the transmission signal can be varied and this allows the direction of scanning to be shifted (or "rotated") without having to mechanically rotate the antennas. For example, by delaying the input signal fed into each element of the antenna array by a factor of time and by changing the duration of the time factor, the direction of the radiation can be controlled. As a non-limiting example, let 'x' be a time constant, then the signal delay to the consecutive array elements 141 should be x, 2x and 3x. The delay could start from left side or the right side of the array (as seen in FIG. 14A). The exact phase shift between antennas and the resulting arc of transmission may be varied to meet specific design requirements.

Figure 11:
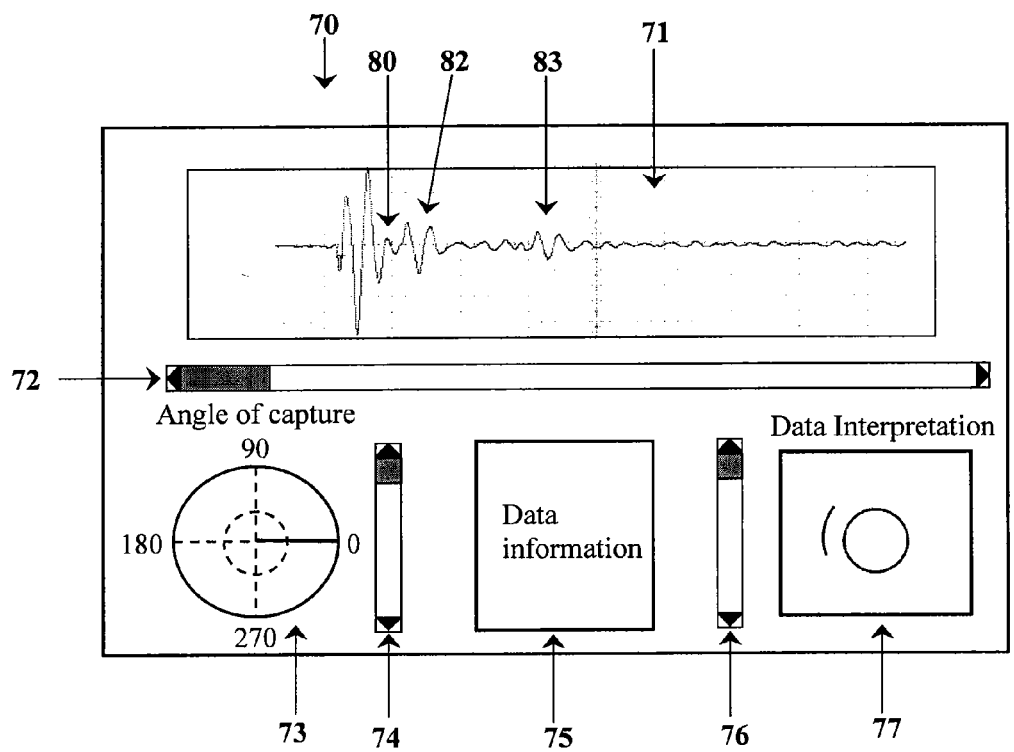
FIG. 11 illustrates one GUI for interpreting signal reflection results.
Figure 12:
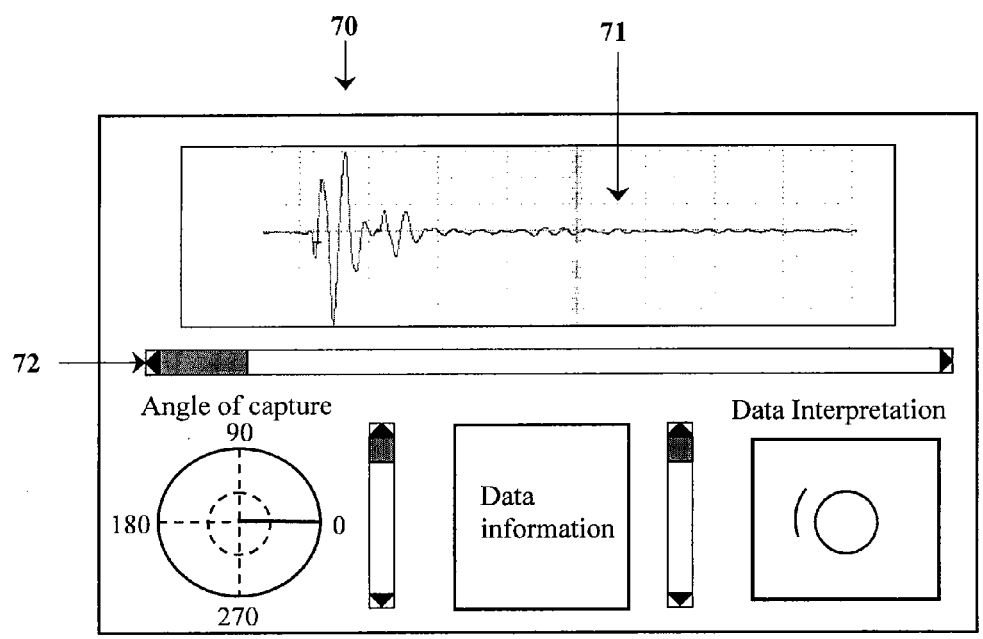
FIG. 12 illustrates another screen of the GUI seen in FIG. 11.

FIGS. 11 and 12 illustrate a graphical user interface (GUI) 70 of one embodiment of software which would collect and display signal results from the transmitter/receiver unit. FIG. 11 shows GUI 70 having a waveform display 71 which reproduces the wave for a return signal from a given position in the conduit. This position in the conduit has an axial component (i.e., along the length of the conduit) and an angular component (the angle at which the antenna was rotated when the signal was received). An axis change scrollbar 72 controls the particular location along the longitudinal axis of the conduit from which the signal in waveform display 71 is derived. The angle change scrollbar 74 and angle of capture display 73 allows the user to change in waveform display 71 the signal captured at a particular antenna angle. A data interpretation plot 77 shows the angular profile of a particular cross-section of the conduit. For example, plot 77 in FIG. 12 illustrates a continuous interface around 360° at 18.5 cm from the transmitting antenna (the inner conduit wall) and a second interface 37.2 cm from the antenna along an approximate 90° arc (which corresponds to a void/soil interface or another interface beyond the conduit wall. In effect, when the user moves the axis change scroll bar 72, he or she sees a series of 2-D images taken at fixed intervals along the length of the conduit. Data information display 75 provides information regarding the data set being reviewed and parameters related thereto.

Waveform display 71 allows the user to see actual signal reflections representing different objects generating reflections. For example, FIG. 11 shows a reference point (signal peak) 80 which represents the end of cross-talk noise from the antennas. The next signal peak 82 represents a reflection from the inner conduit wall. The third signal peak 83 represent the reflection from an interface outside of the conduit. As a point of comparison, it can be seen how the capture angle display 73 in FIG. 12 shows the reflection at 0° capture angle and the waveform in display 71 does not show a third peak 83 (i.e., no interface at this angle). This indicates that there is no interface (e.g., void) outside the conduit at 0°. On the other hand, FIG. 11 illustrates an interface (third signal peak 83) recorded at an angle of 140°, thus indicating a void/soil or some other interface at this angle.

Figure 13:
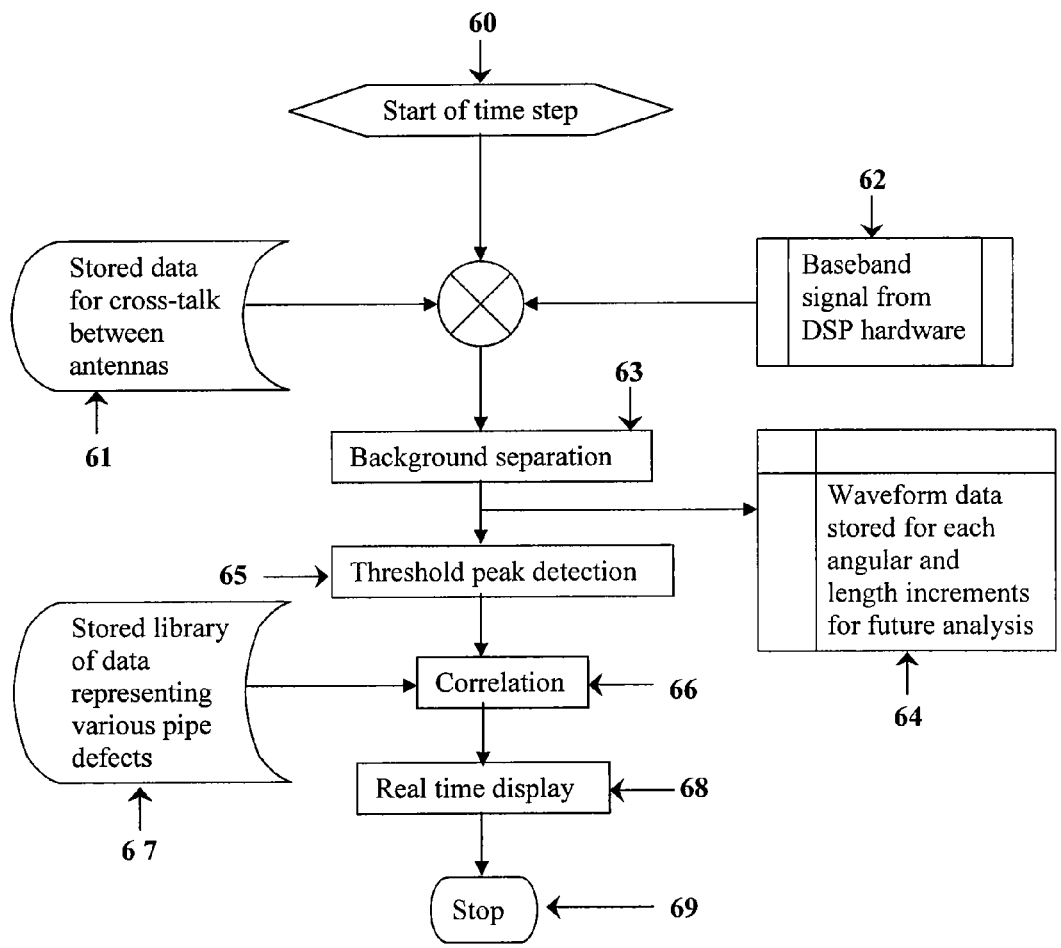
FIG. 13 illustrates one series of signal processing steps which could be employed in the present invention.

FIG. 13 illustrates processing steps which would be performed utilizing one embodiment of the signal processing software (represented at 41 in FIG. 3A). Beginning at start time 60, the software retrieves stored cross talk data (step 61) and base band signal from the DSP hardware (step 62). The cross talk data represents a previously captured signal pattern observed from antenna cross talk absent any other signal source. The base band signal is the output of circuit component 40 described in reference to FIG. 3A.

Background separation step 63 operates to subtract cross talk component of the signal from the baseband signal. In step 64, waveform data collected for each angular and length increment (such as seen in the waveform display of FIG. 11) is stored. Peak detection step 65 is a technique used to distinguish the useful signal coming from the target from the background noise. The background noise will have some amplitude, but it will be less than the signal reflecting from an interface/target, and thus the noise can be eliminated by considering only peaks that are above a particular threshold value.

Step 67 represents retrieval of stored waveform data representing various expected conduit conditions. Such stored waveform data are template waveforms obtained from simulating various conditions (e.g., void beyond conduit wall, a metal pipe beyond conduit wall, etc.) in laboratory conditions. Step 66 correlates the actual signal waveform from step 65 with template waveforms to determine if the actual signal is similar to (and thus likely represents) an expected condition. The correlation step may be accomplished using common pattern recognition approaches including Bayesian classifiers and artificial neural networks (ANN). In a preferred embodiment, the correlation will be carried out using an ANN protocol such as feed forward-back propagation or Kohonen self-organizing networks. If there is a positive correlation, the applicable condition is displayed in step 68. Otherwise, the user will be shown the waveform in display 71 of FIG. 11 and use his or her judgment to interpret what subsurface condition the signal reflections represent.

Although certain embodiments of the invention have been described in relation to the figures, many modifications and variations are within the scope of the invention. For example, while a rotating signal or pair of antennas is shown in the figures, the invention could include an array of fixed antennas on a robotic transporter. Additionally, the UWB transmitter/receiver described above could be used in combination with other conduit inspections methods such as sonar, profilemeter, and/or CCTV.

Another embodiment involves positioning a transmitter/receiver unit (including an antenna) within an underground, substantially nonconductive enclosure, such that a substantial air gap exists between said antenna and an inner wall of said enclosure. A UWB signal is transmitted toward a portion of the inner wall of the enclosure and the return signal is process in order to identify at least one interface between the soil and a region of conductivity different from the soil.

Various alternatives may be employed with the above method. For example, the method may employ a UWB signal frequency of between about 1 GHz and about 15 GHz; or in this method, the antenna may transmit through an arc of less than 30°; or the enclosure may be a conduit designed to carry liquids at near atmospheric pressures; or the conduit may part of a storm-water drainage system or a waste water sewer system; or the conduit may part of a pressurized water supply system; or the conduit may be depressurized and substantially drained prior to insertion of the transmitter/receiver unit; or the conduit may be designed to carry pressurized gases; or two (or more) transmitter/receiver units may be positioned within the conduit and each of the transmitter/receiver units transmit a signal having a pulse duration different from the other; or in this example, one of the transmitter/receiver units transmits a signal with a pulse duration between about 500 nsec and about 100 psec and the second transmitter/receiver units transmits a signal with a pulse duration of less than about 100 psec.

Another embodiment involves a transmitter/receiver unit having circuitry producing a first UWB signal with a pulse length between about 500 nsec and about 100 psec and a second UWB signal with a pulse length less than 100 psec. This transmitter/receiver unit further includes at least one antenna transmitting the signal over an arc of at least 120°. In this embodiment, the transmitter/receiver unit may employ a tunable signal generator; or the circuitry may include first and second signal generators producing signals of differing pulse lengths; or the antenna may be a rotating antenna; the antenna may include an antenna array.

In certain embodiments, the invention may also function as profilometer, particularly in pipes 36" in diameter and larger. Since many embodiments of the invention measure the distance between the antenna and the inner wall of the pipe and can plot the inner profile of the pipe, these embodiments may detect excessive ovality in the pipe cross-section.

The above described embodiments and all obvious variations and modifications are intended to come within the scope of the following claims.

We claim:

1. A method of surveying the condition of an underground enclosure comprising:
   a. positioning at least one transmitter/receiver unit, including an antenna, within an underground, substantially nonconductive enclosure, such that a substantial air gap exists between said antenna and an inner wall of said enclosure;
   b. transmitting a UWB signal toward at least a portion of an inner wall of said enclosure: and
   c. processing a return signal from said transmitted signal in order to identify at least one interface between soil and a region having different electrical properties from said soil.

2. The enclosure survey method of claim 1, wherein said nonconductive enclosure comprises an underground conduit.

3. The enclosure survey method of claim 2, wherein said interface is at least one of a soil/conduit interface, a void/soil interface, a soil/boulder interface, or a soil/external pipe interface.

4. The enclosure survey method of claim 3, wherein the frequency of said UWB signal is between about 3 GHz and about 10 GHz.

5. The enclosure survey method of claim 4, further comprising transmitting a second UWB signal between about 20 GHz and about 30 GHz.

6. The enclosure survey method of claim 1, wherein said signal comprises a pulse duration of less than about 500 psec and between about $10^3$ and about $10^5$ pulses per second.

7. The enclosure survey method of claim 1, further comprising transmitting a first signal with a pulse duration between about 500 psec and about 100 psec and transmitting a second signal with a pulse duration of less than about 100 psec.

8. The enclosure survey method of claim 1, further comprising an antenna which rotates through an arc of at least 120°.

9. The enclosure survey method of claim 8, wherein said antenna rotates through an arc of 360°.

10. The enclosure survey method of claim 1, wherein said antenna is a directional antenna.

11. The enclosure survey method of claim 1, further comprising a transmitting antenna and a separate receiving antenna.

12. The enclosure survey method of claim 1, wherein a distance between a receiver antenna and at least one of a void/enclosure interface, a soil/enclosure interface or a soil/void interface is identified by a signal reflection generated by a change in conductivity of the transmission medium at said interfaces.

13. The enclosure survey method of claim 1, wherein said transmitter/receiver unit is capable of transmitting more than one signal at differing pulse durations.

14. The enclosure survey method of claim 13, wherein said transmitter/receiver unit has multiple signal generators.

15. The enclosure survey method of claim 13, wherein said transmitter/receiver unit has at least one tunable signal generator.

16. The enclosure survey method of claim 1, further comprising an antenna which is fixed against rotation.

17. The enclosure survey method of claim 1, further comprising a plurality of antennas.

18. The enclosure survey method of claim 17, wherein said plurality of antennas are discone antennas.

19. The enclosure survey method of claim 18, wherein a signal fed to each of said antennas is phase shifted from a signal fed to an adjacent antenna, thereby creating a phased array system.

20. The enclosure survey method of claim 1, wherein said signal is a time domain UWB pulsed signal.

21. The enclosure survey method of claim 20, wherein said time domain UWB pulsed signal has consecutive pulses with substantially identical wave forms.

* * * * *